(12) United States Patent
Tsai et al.

(10) Patent No.: US 12,214,462 B2
(45) Date of Patent: Feb. 4, 2025

(54) MONITORING METHOD AND SYSTEM FOR MACHINE TOOL

(71) Applicant: INDUSTRIAL TECHNOLOGY RESEARCH INSTITUTE, Hsinchu (TW)

(72) Inventors: Chun-Yu Tsai, New Taipei (TW); Chi-Chen Lin, Taichung (TW); Sheng-Ming Ma, Taichung (TW); Ta-Jen Peng, Taichung (TW)

(73) Assignee: INDUSTRIAL TECHNOLOGY RESEARCH INSTITUTE, Hsinchu (TW)

(*) Notice: Subject to any disclaimer, the term of this patent is extended or adjusted under 35 U.S.C. 154(b) by 651 days.

(21) Appl. No.: 17/241,479

(22) Filed: Apr. 27, 2021

(65) Prior Publication Data

US 2022/0193852 A1 Jun. 23, 2022

(30) Foreign Application Priority Data

Dec. 21, 2020 (TW) ................................ 109145291

(51) Int. Cl.
  *B23Q 17/12* (2006.01)
  *B23Q 17/09* (2006.01)
  (Continued)

(52) U.S. Cl.
  CPC ......... *B23Q 17/12* (2013.01); *B23Q 17/0971* (2013.01); *G01B 17/08* (2013.01);
  (Continued)

(58) Field of Classification Search
  CPC B23Q 17/12; B23Q 17/0971; B23Q 17/0976; B23Q 15/12; G05B 19/4065;
  (Continued)

(56) References Cited

U.S. PATENT DOCUMENTS

| 4,744,242 A | 5/1988 | Anderson et al. |
| 8,229,598 B2 | 7/2012 | Suzuki et al. |

(Continued)

FOREIGN PATENT DOCUMENTS

| CN | 101685042 A | 3/2010 |
| CN | 102387892 A | 3/2012 |

(Continued)

OTHER PUBLICATIONS

"Automation Technology of Mechanical Manufacturing", Sep. 30, 2001, 1 page, with an English abstract.

(Continued)

*Primary Examiner* — Yoshihisa Ishizuka
*Assistant Examiner* — Carter W Ferrell
(74) *Attorney, Agent, or Firm* — Birch, Stewart, Kolasch & Birch, LLP (57) ABSTRACT

A monitoring method and a monitoring system for a machine tool to machine a workpiece are provided. The monitoring method includes the following steps. First, a vibration signal of a spindle of the machine tool is detected. Next, a vibration feature value of the vibration signal is obtained. Whether the vibration feature value exceeds a threshold condition is determined, wherein the threshold condition is determined by a training model based on a predetermined surface quality of the workpiece. When the vibration feature value exceeds the threshold condition, a machining parameter of the machine tool is adjusted.

6 Claims, 8 Drawing Sheets

(51) Int. Cl.
    *G01B 17/08* (2006.01)
    *G05B 19/18* (2006.01)
    *G05B 19/4063* (2006.01)
    *G06N 20/00* (2019.01)

(52) U.S. Cl.
    CPC ........ *G05B 19/182* (2013.01); *G05B 19/4063* (2013.01); *G05B 2219/35529* (2013.01); *G05B 2219/37434* (2013.01); *G06N 20/00* (2019.01)

(58) Field of Classification Search
    CPC ........ G05B 2219/37434; G05B 19/404; G05B 2219/41256; G05B 2219/37402; G05B 2219/37435; G05B 19/401; G05B 19/4163; G05B 17/08; G05B 19/182; G05B 19/4063; G05B 19/35529; G05B 19/416
    See application file for complete search history.

(56) References Cited

U.S. PATENT DOCUMENTS

| | | | |
|---|---|---|---|
| 8,256,590 B2 | 9/2012 | Suzuki et al. | |
| 2009/0110499 A1* | 4/2009 | Inagaki | F16F 15/002 408/143 |
| 2010/0034609 A1* | 2/2010 | Doppenberg | B23Q 17/0976 409/134 |
| 2012/0010744 A1* | 1/2012 | Yamashita | B23Q 17/0976 700/173 |
| 2017/0060104 A1* | 3/2017 | Genma | G05B 13/0265 |
| 2018/0004196 A1 | 1/2018 | Kawai et al. | |
| 2020/0033842 A1 | 1/2020 | Masuda et al. | |
| 2020/0073344 A1* | 3/2020 | Uenishi | G05B 13/0265 |
| 2021/0364482 A1* | 11/2021 | Wang | G06N 3/08 |
| 2022/0212303 A1* | 7/2022 | Hofbauer | G05B 19/4163 |
| 2022/0244701 A1* | 8/2022 | Brand | G05B 19/4061 |

FOREIGN PATENT DOCUMENTS

| | | | |
|---|---|---|---|
| CN | 102478825 A | | 5/2012 |
| CN | 101722438 B | | 9/2014 |
| CN | 105058165 A | | 11/2015 |
| CN | 105807719 A | | 7/2016 |
| CN | 105676778 A | | 6/2018 |
| CN | 108363822 A | | 8/2018 |
| CN | 108629664 A | | 10/2018 |
| CN | 109376670 A | | 2/2019 |
| CN | 109753632 A | | 5/2019 |
| CN | 110033101 A | | 7/2019 |
| CN | 110192160 A | | 8/2019 |
| CN | 110456733 A | | 11/2019 |
| CN | 111177911 A | | 5/2020 |
| CN | 111230143 A | | 6/2020 |
| CN | 111366123 A | | 7/2020 |
| CN | 111782624 A | | 10/2020 |
| CN | 111859566 A | | 10/2020 |
| DE | 10 2019 110 137 A1 | | 10/2020 |
| TW | 200630182 A | | 9/2006 |
| TW | 201545833 A | | 12/2015 |
| TW | 201807522 A | * | 3/2018 |
| WO | WO 2014/064953 A1 | | 5/2014 |
| WO | WO2018/119845 A1 | | 7/2018 |
| WO | WO-2020217614 A1 | * | 10/2020 |

OTHER PUBLICATIONS

Chinese Office Action and Search Report for Chinese Application No. 202110043059.9, dated Jun. 17, 2023.

Chinese Office Action and Search Report for Chinese Application No. 202110043059.9, dated Apr. 26, 2024.

* cited by examiner

MONITORING METHOD AND SYSTEM FOR MACHINE TOOL

This application claims the benefit of Taiwan application Serial No. 109145291, filed Dec. 21, 2020, the disclosure of which is incorporated by reference herein in its entirety.

TECHNICAL FIELD

The disclosure relates in general to a monitoring method and a monitoring system, and more particularly to a monitoring method and a monitoring system for a machine tool.

BACKGROUND

In the past, to ensure the surface quality of the workpiece, the machinist had to spend a lot of time to test the machining parameters when machining with a machine tool; however, this method relies on the experience of the machinist. Moreover, for the short supply chain with small variety and large volume, due to many styles of components, it is necessary to re-sample and test the parameters every time a workpiece is produced, which makes the production speed often fail to catch up with the order.

In view of the above reasons, there is a need for a way to monitor the machining status of the machine tool at any time so as to adjust the machining parameters accordingly without affecting the predetermined surface quality of the workpiece.

SUMMARY

The disclosure is directed to a monitoring method and a monitoring system for a machine tool to solve the aforementioned problems.

According to one embodiment, a monitoring method for a machine tool to machine a workpiece is provided. The monitoring method includes the following steps. First, a vibration signal of a spindle of the machine tool is detected. Next, a vibration feature value of the vibration signal is obtained. Whether the vibration feature value exceeds a threshold condition is determined, wherein the threshold condition is determined by a training model based on a predetermined surface quality of the workpiece. When the vibration feature value exceeds the threshold condition, a machining parameter of the machine tool is adjusted.

According to another embodiment, a monitoring system is provided. The monitoring system includes a machine tool, a signal sensing unit, a signal processing unit, a monitoring unit and a parameter adjustment unit. The machine tool includes a spindle for machining a workpiece. The signal sensing unit is configured for detecting a vibration signal of the spindle of the machine tool. The signal processing unit is configured for obtaining a vibration feature value of the vibration signal. The monitoring unit is configured for determining whether the vibration feature value exceeds a threshold condition, wherein the threshold condition is determined by a training model based on a predetermined surface quality of the workpiece. The parameter adjustment unit is configured for adjusting a machining parameter of the machine tool when the vibration feature value exceeds the threshold condition.

The above and other embodiments of this disclosure will become better understood with regard to the following detailed description. The following description is made with reference to the accompanying drawings.

BRIEF DESCRIPTION OF THE DRAWINGS

FIG. 8A shows the waveform of the cutting vibration signal for machining a workpiece using the machine tool, illustrating the situation when the monitoring system according to one embodiment of the disclosure is not turned on.

FIG. 8B shows the waveform of the cutting vibration signal for machining a workpiece using the machine tool, illustrating the situation when the monitoring system according to one embodiment of the disclosure is turned on.

DETAILED DESCRIPTION

Each embodiment of the disclosure will be described in detail below and illustrated with drawings. In addition to these detailed descriptions, the disclosure may be broadly implemented in other embodiments, and any easy substitution, modification, or equivalent variation of the described embodiments is included in the scope of the disclosure and is covered by the scope of the claims thereafter. In the description of the specification, many specific details and examples of embodiments are provided to provide the reader with a more complete understanding of the disclosure; however, these specific details and examples of embodiments should not be considered as limitations of the disclosure. In addition, well known steps or components are not described in detail to avoid unnecessary limitations of the disclosure.

Figure 1:
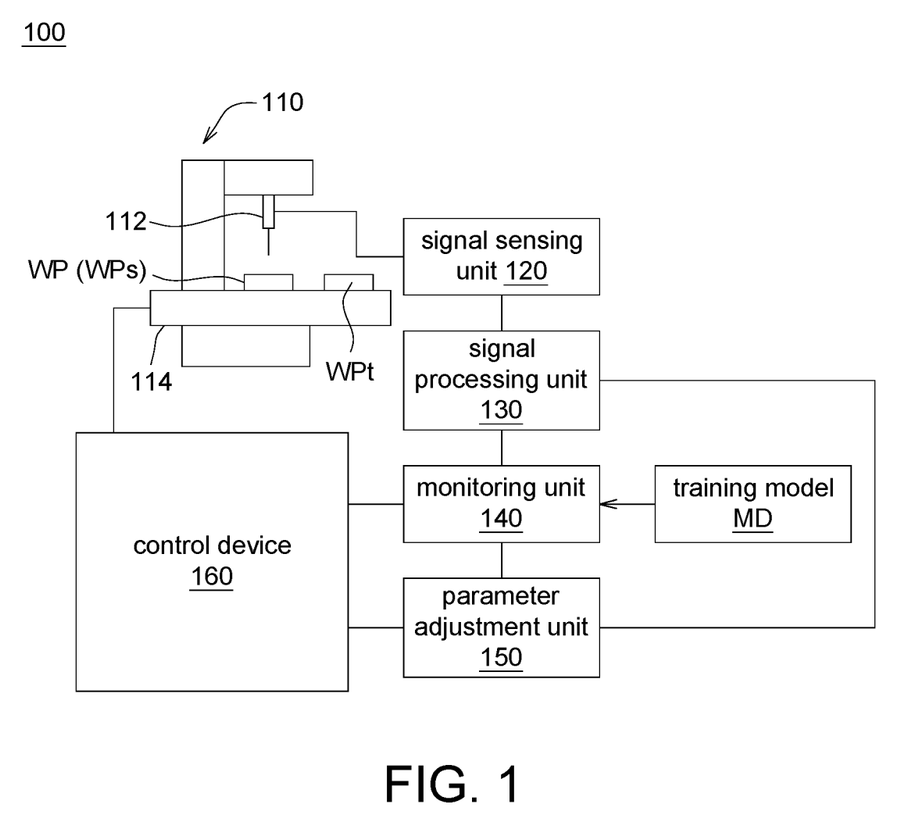
FIG. 1 is a simplified schematic diagram of a monitoring system according to one embodiment of the disclosure.

Referring to FIG. 1, which is a simplified schematic diagram of a monitoring system 100 according to one embodiment of the disclosure. The monitoring system 100 includes a machine tool 110, a signal sensing unit 120, a signal processing unit 130, a monitoring unit 140, a parameter adjustment unit 150, and a control device 160. In the embodiment, the machine tool 110 includes a spindle 112 and a workpiece table 114, and a tool (not shown) may be installed at the nose end of the spindle 112. The control device 160 is coupled to the machine tool 110 to control the machine tool 110 to machine the workpiece WP on the workpiece table 114. In the embodiment, the milling machine is exemplified for illustration, but the machine tool 110 of the disclosure is not limited thereto.

The signal sensing unit 120 is coupled to the spindle 112 of the machine tool 110 and is configured for detecting the vibration signal of the spindle 112. The signal sensing unit 120 is, for example but not limited to, a sensor such as an accelerometer, a displacement meter, a microphone, etc. that may measure the vibration state. The signal processing unit 130 is coupled to the signal sensing unit 120 and is configured for receiving the vibration signal detected by the signal sensing unit 120, and for processing the vibration signal. The monitoring unit 140 is coupled to the signal processing unit 130, the parameter adjustment unit 150 and the control device 160, and is configured for monitoring the signal processed by the signal processing unit 130 to keep track of the machining status of the machine tool 110. If the current machining status is determined to be as expected, the control unit 160 is commanded to continue machining, and the control unit 160 may control the machine tool 110 based on the numerical control code. In case of poor machining status that may affect the surface quality of the workpiece WP, the parameter adjustment unit 150 is immediately commanded to adjust the machining parameter, and the numerical control code of the control device 160 may read the adjusted machining parameter stored in the temporary storage area to control the machine tool 110, so as to ensure that the workpiece WP meets the desired surface quality.

Figure 2:
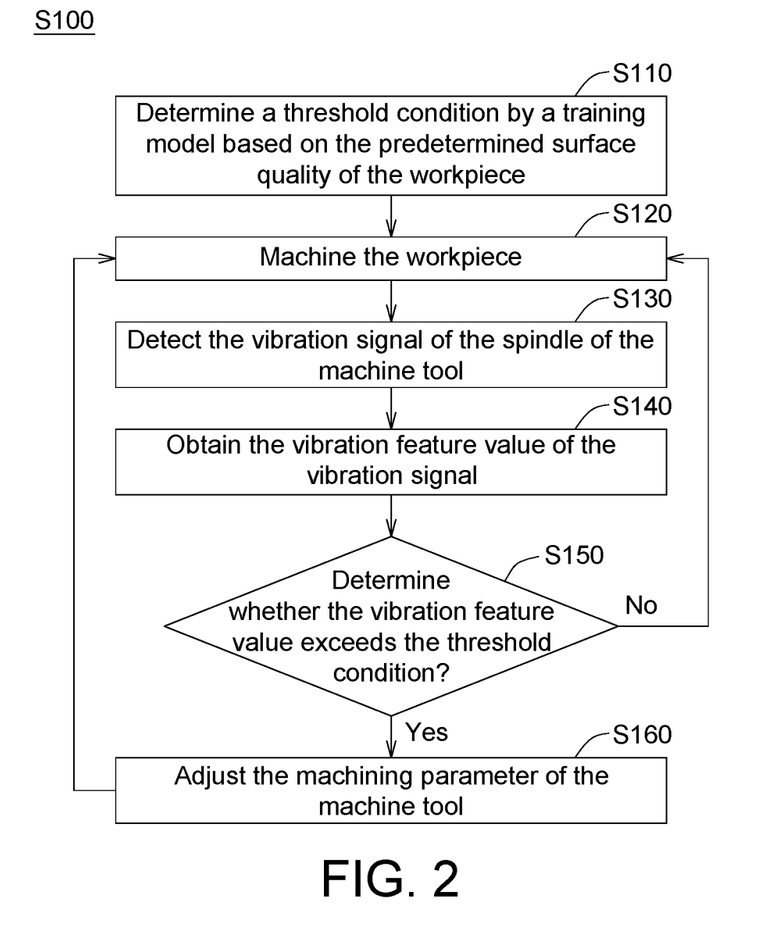
FIG. 2 is a flowchart of a monitoring method according to one embodiment of the disclosure.

FIG. 2 is a flowchart of a monitoring method S100 according to one embodiment of the disclosure. Referring to FIG. 1 and FIG. 2, in step S110, a threshold condition is first determined by a training model MD based on the predetermined surface quality of the workpiece WP. The threshold condition is used as a criterion for the monitoring unit 140 to monitor the machining status of the machine tool 110. If the machining status meets the threshold condition, it means that the surface quality of the machined workpiece WP meets the desired predefined value. In some embodiments, the predetermined surface quality is related to the surface roughness of the workpiece WP, which may be, but is not limited to, the center-line average roughness (Ra), or the ten-point average roughness (Rz).

Herein, the training model MD may generate the threshold condition based on the predetermined surface quality of the workpiece WP. The training model MD may be constructed by a machine learning algorithm (e.g., neural network) for training. During the training process of the training model MD, the training model MD is trained using a machining quality database. Once the training is completed, the predetermined surface quality of the workpiece WP may be input into the training model MD by the user, and the training model MD may output the corresponding threshold condition for the monitoring unit 140 to monitor the machining status of the machine tool 110.

Figure 3:
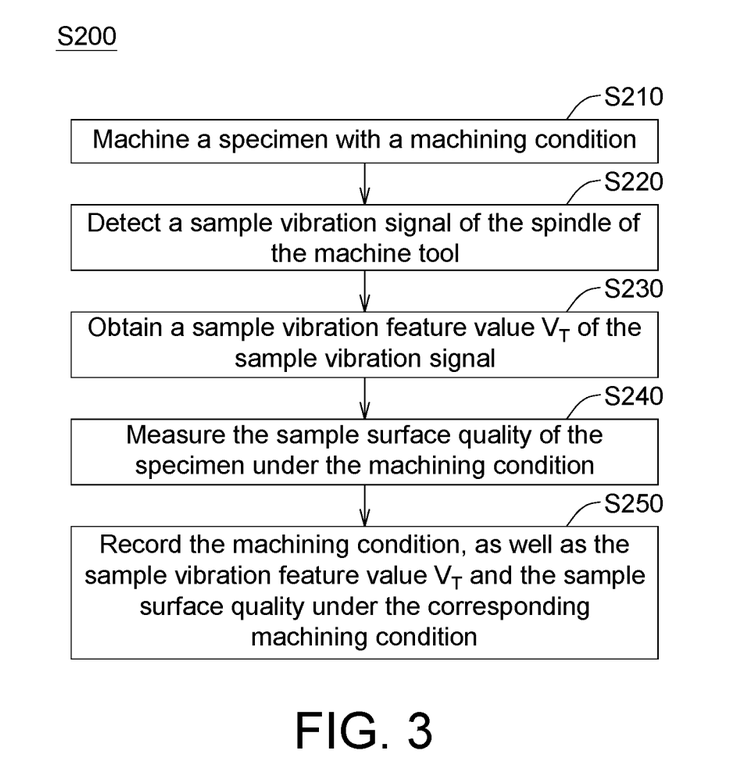
FIG. 3 is a flowchart of a method for establishing a machining quality database according to one embodiment of the disclosure.

FIG. 3 is a flowchart of a method S200 for establishing a machining quality database according to one embodiment of the disclosure. Referring to FIG. 1 and FIG. 3, in step S210, the machine tool 110 machines a specimen WPs with a machining condition. The machining condition may include the spindle speed and/or a feed speed of the machine tool 110.

Next, in step S220, the signal sensing unit 120 detects a sample vibration signal of the spindle 112 of the machine tool 110. Then, in step S230, the signal processing unit 130 obtains a sample vibration feature value $V_T$ of the sample vibration signal. Generally speaking, the sample vibration signal (original vibration signal) detected by the signal sensing unit 120 contains a lot of noise unrelated to cutting, so it is necessary to extract the sample vibration feature value $V_T$ by the signal processing unit 130 to obtain the sample cutting vibration signal related to cutting. The sample vibration feature value $V_T$ represents the vibration related to the machining area during machining of the machine tool 110, but not the external vibration from the non-machining area.

Figure 4:
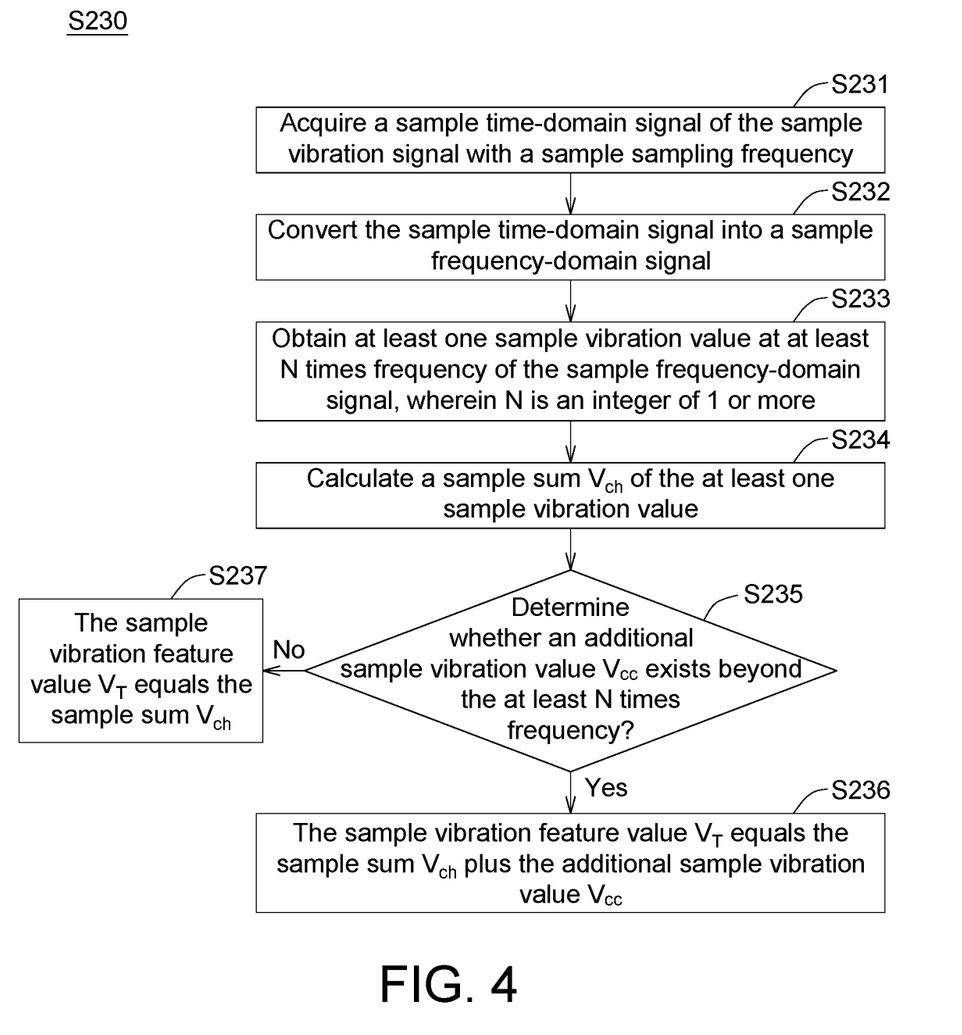
FIG. 4 is the step of obtaining the sample vibration feature value of the sample vibration signal according to one implementation.
Figure 5A:
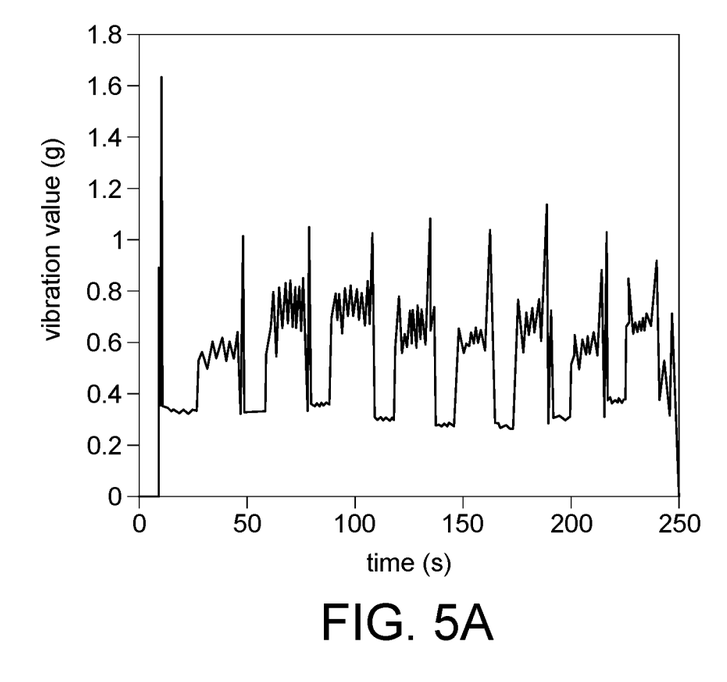
FIG. 5A shows the waveform of the sample vibration signal.
Figure 5B:
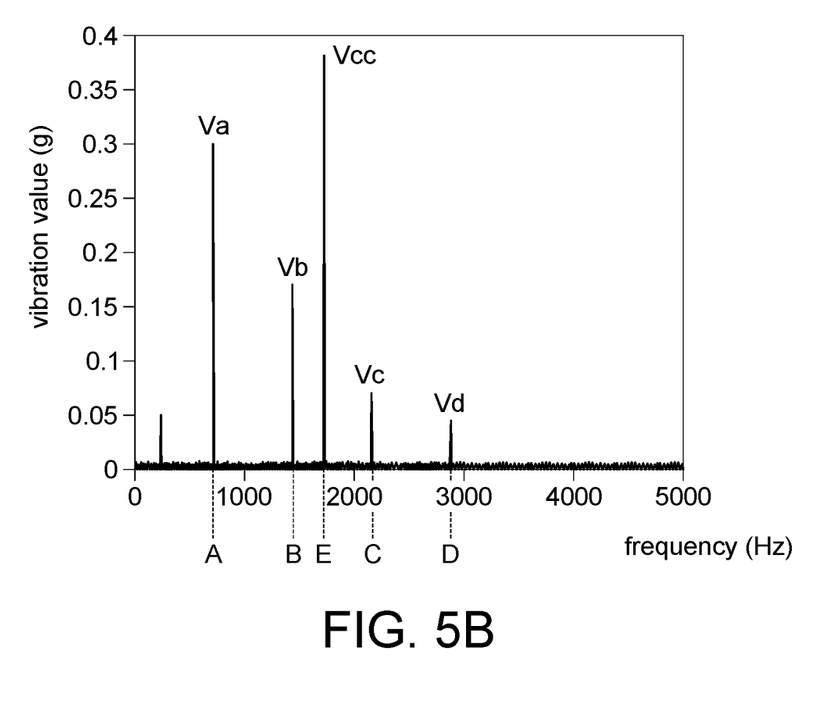
FIG. 5B shows the waveform of the sample frequency-domain signal.

Further, also refer to FIG. 1, FIG. 4, FIG. 5A and FIG. 5B. FIG. 4 is the step S230 of obtaining the sample vibration feature value $V_T$ of the sample vibration signal according to one implementation. FIG. 5A shows the waveform of the sample vibration signal. FIG. 5B shows the waveform of the sample frequency-domain signal. As shown in FIG. 5A, the sample vibration signal contains a lot of noise unrelated to cutting, so it is necessary to process this signal.

In step S231, the signal processing unit 130 acquires a sample time-domain signal of the sample vibration signal with a sample sampling frequency. For example, the signal processing unit 130 may sample the vibration value with a sample sampling frequency of 10,000 times per second to obtain the sample time-domain signal. Then, as in step S232, the signal processing unit 130 converts the sample time-domain signal into a sample frequency-domain signal using Fourier transform. For example, as shown in FIG. 5B, the sample frequency-domain signal corresponding to one of the sampling intervals of the sample time-domain signal is shown.

Next, in step S233, the signal processing unit 130 obtains at least one sample vibration value corresponding to at least one frequency equal to N multiple of a fundamental frequency of the sample frequency-domain signal, wherein N is an integer of 1 or more. For example, as shown in FIG. 5B, the waveform at 1 multiple of the fundamental frequency (cutting frequency multiplication A) usually has the maximum vibration amplitude (corresponding to the sample vibration value Va), and then the vibration amplitude decreases as the frequency multiplication increases. In the present example, at least 1 multiple of the fundamental frequency to 4 multiples of the fundamental frequency may be obtained, corresponding to the sample vibration value Va at the cutting frequency multiplication A, the sample vibration value Vb at the cutting frequency multiplication B, the sample vibration value Vc at the cutting frequency multiplication C, and the sample vibration value Vd at the cutting frequency multiplication D.

Next, in step S234, the signal processing unit 130 calculates a sample sum $V_{ch}$ of the at least one sample vibration value. For example, as shown in FIG. 5B, the sample sum $V_{ch}$=Va+Vb+Vc+Vd.

Next, in step S235, the signal processing unit 130 determines whether an additional sample vibration value Vcc exists beyond the N multiple of the fundamental frequency of the sample frequency-domain signal, and the additional sample vibration value Vcc is greater than the sample vibration value Va corresponding to 1 multiple of the fundamental frequency of the sample frequency-domain signal. If yes, step S236 is performed; if not, step S237 is performed.

For example, as shown in FIG. 5B, there is an additional sample vibration value $V_{cc}$, which is larger than the sample vibration value Va, at a frequency E other than the frequency multiplication, and the vibration at frequency E may result from the chatter phenomenon caused by the machine tool 110 being in unstable cutting. Therefore, the additional sample vibration value $V_{cc}$ should be taken into account when calculating the sample vibration feature value $V_T$. As in step S236, the sample vibration feature value $V_T$ equals the sum of the sample sum $V_{ch}$ and the additional sample vibration value $V_{cc}$. On the contrary, if the additional sample vibration value $V_{cc}$ is not found, then the sample vibration feature value $V_T$ equals the sample sum $V_{ch}$, as in step S237.

Returning to FIG. 1 and FIG. 3, after the sample vibration feature value $V_T$ is obtained, step S240 is performed to measure the sample surface quality of the specimen WPs under the machining condition. Afterwards, in step S250, the aforementioned machining condition, as well as the sample vibration feature value $V_T$ and the sample surface quality under the corresponding machining condition are recorded in the machining quality database.

Referring to FIG. 1 and FIG. 2, after the threshold condition is determined, step S120 is performed, and the machine tool 110 machines the workpiece WP. Next, in step S130, the signal sensing unit 120 detects the vibration signal of the spindle 112 of the machine tool 110. Then, in step S140, the signal processing unit 130 obtains the vibration feature value of the vibration signal. In step S140, the vibration feature value is obtained as the manner described in the implementation of the step S230, and the vibration feature value is acquired so as to obtain the cutting vibration signal related to cutting. That is, the time-domain signal of the vibration signal is acquired with a sampling frequency; the time-domain signal is converted to a frequency-domain signal; at least one vibration value corresponding to at least one frequency equal to N multiple of a fundamental frequency of the frequency-domain signal is obtained, wherein N is an integer of 1 or more; the sum of the at least one vibration value is calculated; and whether an additional vibration value exists beyond the N multiple of the fundamental frequency is determined, and the additional vibration value is greater than the vibration value corresponding to 1 multiple of the fundamental frequency. If there is an additional vibration value, the vibration feature value equals the sum plus the additional vibration value; if there is no additional vibration value, the vibration feature value equals the sum. Examples will not be repeated here again.

Next, in step S150, the monitoring unit 140 determines whether the vibration feature value exceeds the threshold condition determined in step S110. If the vibration feature value does not exceed the threshold condition, it means that the surface quality of the workpiece WP machined with the current machining parameter may meet the desired predefined value. It returns to step S120, and the monitoring unit 140 commands the control unit 160 to continue machining the workpiece WP with the current machining parameter. If the vibration feature value exceeds the threshold condition, it means that the surface quality of the workpiece WP machined with the current machining parameter may not meet the desired predefined value. Then step S160 is performed, and the monitoring unit 140 commands the parameter adjustment unit 150 to adjust the machining parameter of the machine tool 110. In one embodiment, during the adjustment of the machining parameter, the monitoring unit 140 may command the control unit 160 to pause the machining of the workpiece WP by the machine tool 110, and then command the control unit 160 to rotate the workpiece table 114 for a trial machining of a test piece WPt to find out the suitable machining parameter.

Figure 6:
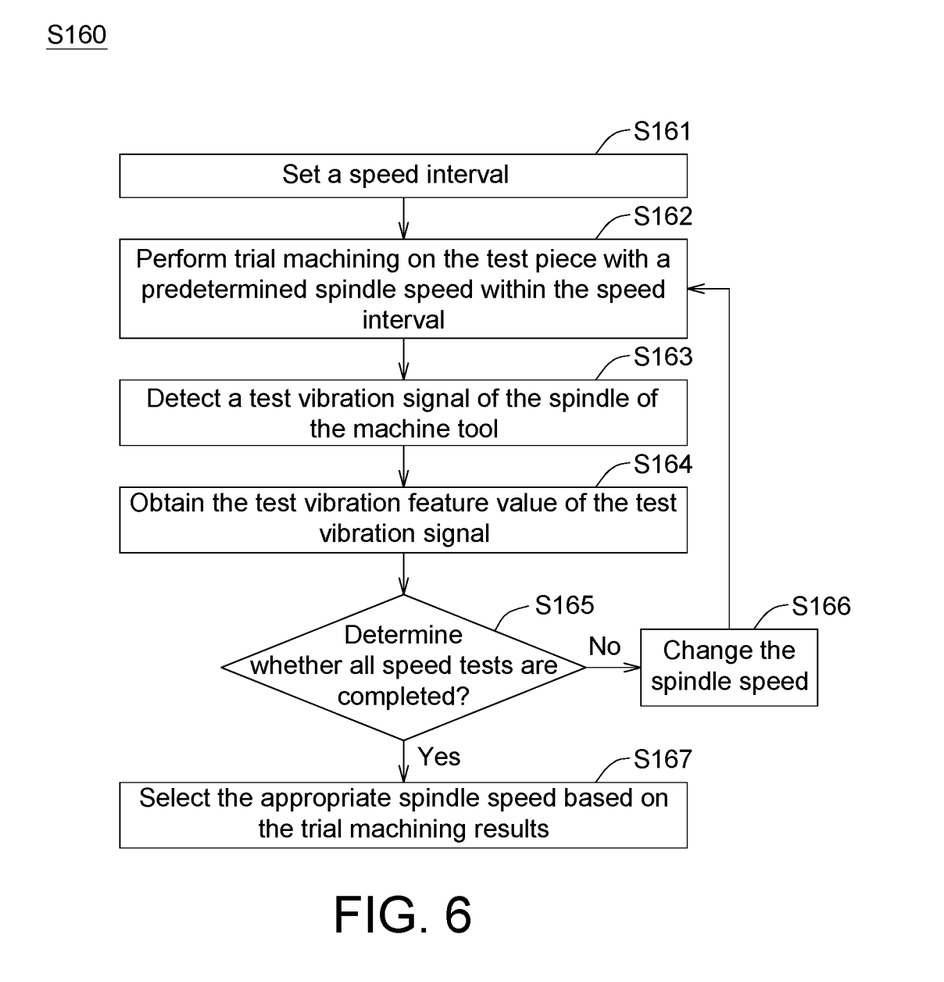
FIG. 6 is the step of adjusting the machining parameter of the machine tool according to one implementation.

In one embodiment, step S160 of adjusting the machining parameter of the machine tool 110 includes obtaining an optimized spindle speed of the machine tool 110, and the optimized spindle speed is obtained as the manner shown in FIG. 6, which is the step S160 of adjusting the machining parameter of the machine tool 110 according to one implementation. Referring to FIG. 1 and FIG. 6, in step S161, first, the parameter adjustment unit 150 sets a speed interval including any speed value between an initial spindle speed and a final spindle speed.

Next, the parameter adjustment unit 150 commands the control device 160 to iteratively execute step S162 to step S166 with different spindle speeds within the speed interval until all speed tests are completed.

In detail, in step S162, the parameter adjustment unit 150 first selects a predetermined spindle speed, and commands the control device 160 to perform trial machining on the test piece WPt with the predetermined spindle speed.

In step S163, the signal sensing unit 120 detects a test vibration signal of the spindle 112 of the machine tool 110. Next, in step S164, the signal processing unit 130 obtains the test vibration feature value of the test vibration signal. In step S164, the test vibration feature value is obtained as the manner described in the implementation of the step S230, and the test vibration feature value is acquired so as to obtain the cutting vibration signal related to cutting. Examples will not be repeated here again. Then, in step S165, whether all speed tests are completed is determined. If not yet, the parameter adjustment unit 150 changes the spindle speed, as shown in step S166, and continues performing step S162 according to the spindle speed. Conversely, if all speed tests in the speed interval are completed, step S167 is performed and the parameter adjustment unit 150 selects the appropriate spindle speed based on the trial machining results.

Figure 7:
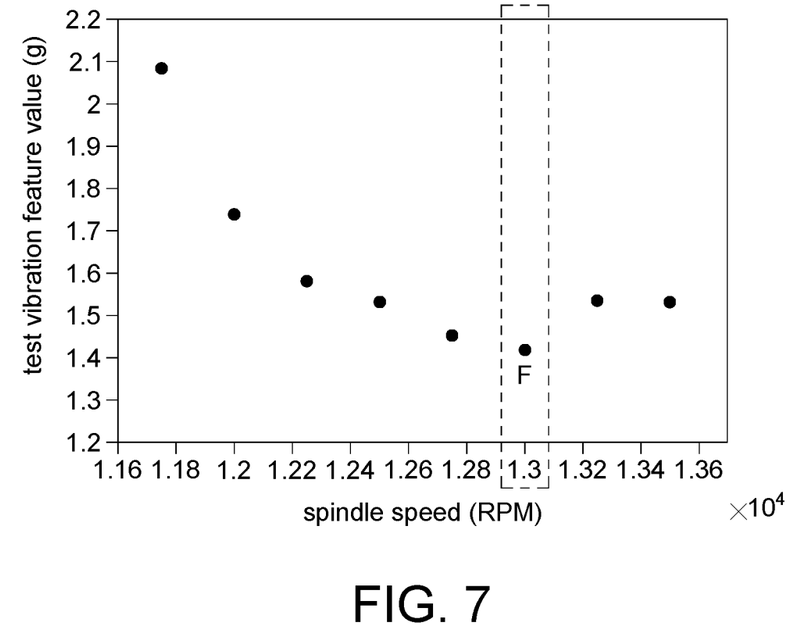
FIG. 7 shows the relationship between the spindle speed and the test vibration feature value.

Here, the parameter adjustment unit 150 may rank the spindle speed and the test vibration feature value based on the trial machining results, so as to obtain the optimized spindle speed. As shown in FIG. 7, which shows the relationship between the spindle speed and the test vibration feature value. According to the trial machining results, the test vibration feature value under the spindle speed condition at point F is the smallest. Therefore, the parameter adjustment unit 150 considers the spindle speed at point F as the optimized spindle speed, updates the machining parameter accordingly, and commands the control unit 160 to return the workpiece WP to the previous pause position according to the updated machining parameter, so as to continue machining.

Of course, step S160 of adjusting the machining parameter of the machine tool 110 is not limited to the above embodiment. For example, it is not necessary for the parameter adjustment unit 150 to find the optimized spindle speed. As long as the workpiece WP machined under the machining condition with the spindle speed meets its predetermined surface quality, the spindle speed may be considered as a suitable spindle speed.

Figure 8A:
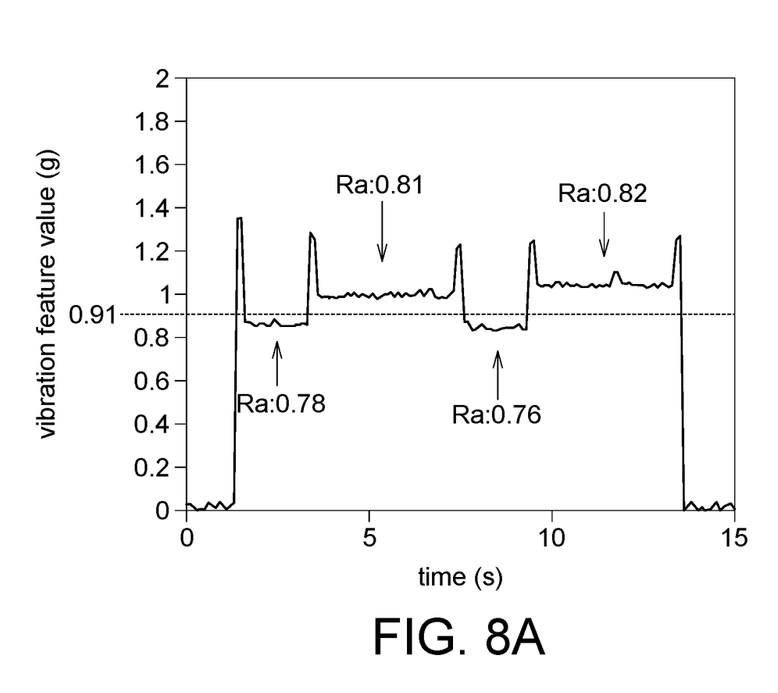
Figure 8B:
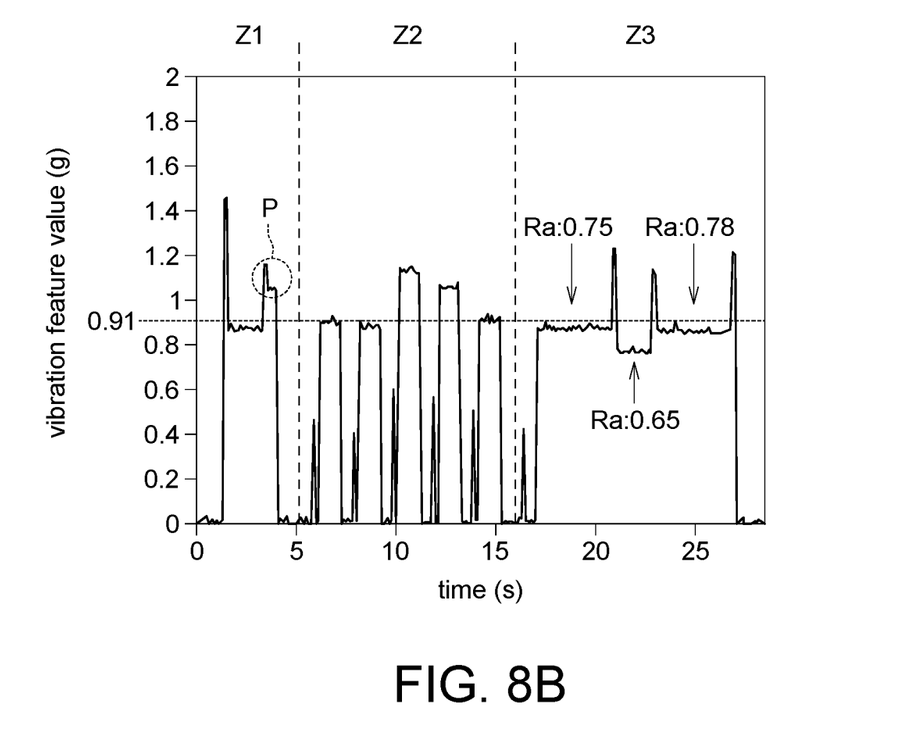

The following is an example of cutting a stainless steel cell phone case with reference to FIG. 8A, FIG. 8B and FIG. 8B.

FIG. 8A shows the waveform of the cutting vibration signal for machining a workpiece WP using the machine tool 110, illustrating the situation when the monitoring system 100 according to one embodiment of the disclosure is not turned on. Here, the waveform of the cutting vibration signal may be obtained according to the vibration feature value obtained in step S140 stated above, so as to show the cutting vibration signal related to cutting. In the embodiment, the predetermined surface quality (surface roughness Ra) of the workpiece WP is 0.8 μm, and the corresponding threshold condition determined by the training model MD is 0.91 g, wherein g is the acceleration value of gravity. As shown in FIG. 8A, when the vibration feature value does not exceed 0.91 g, the measured surface roughness Ra of the workpiece WP meets the expected value of 0.8 μm. Once the vibration feature value exceeds 0.91 g, the measured surface roughness Ra of the workpiece WP does not meet the expected value.

Figure 8C:
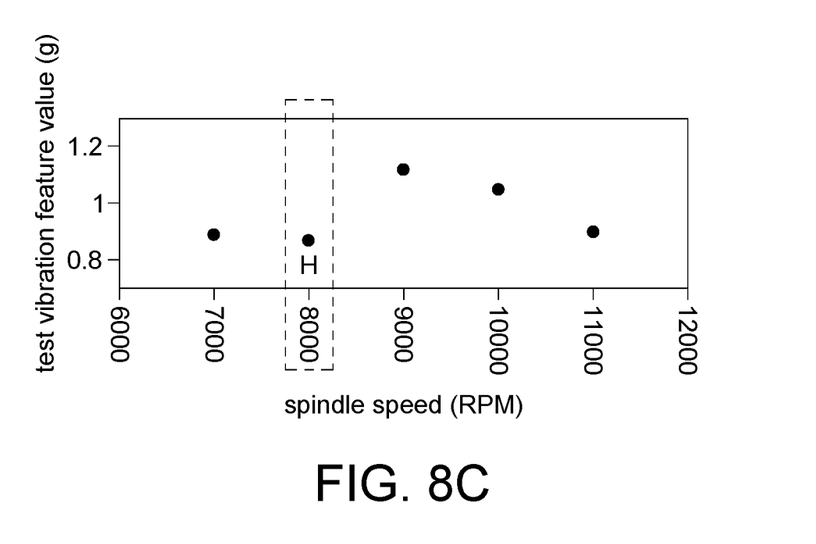
FIG. 8C shows the relationship between the spindle speed and the test vibration feature value obtained by adjusting the machining parameter in the parameter adjustment interval.

FIG. 8B shows the waveform of the cutting vibration signal for machining the workpiece WP using the machine tool 100, illustrating the situation when the monitoring system 100 according to one embodiment of the disclosure is turned on. FIG. 8C shows the relationship between the spindle speed and the test vibration feature value obtained by adjusting the machining parameter in the parameter adjustment interval. Referring to FIG. 8B, in the initial machining zone Z1, the monitoring unit 140 determines that the vibration feature value at point P has exceeded the threshold condition, and then commands the parameter adjustment unit 150 to adjust the machining parameter. In the parameter adjustment zone Z2, the parameter adjustment unit 150 performs five sets of trial cutting tests to obtain the corresponding relationship for five sets of the spindle speeds and the test vibration feature values, as shown in FIG. 8C. In FIG. 8C, the test vibration feature value under the spindle speed condition at point H is the smallest. Therefore, the parameter adjustment unit 150 considers the spindle speed at point H as the optimal spindle speed and adjusts the machining parameters according to the optimized spindle speed. Referring to FIG. 8B, the parameter adjustment unit 150 then commands the control device 160 to continue machining. In the successive machining zone Z3, the measured surface roughness Ra of the workpiece WP meet the expected value.

In summary, the monitoring method and monitoring system for a machine tool provided according to the disclosure may establish a threshold condition based on the predetermined surface quality of a workpiece. In this way, even if the machine tool is in a steady-state cutting situation, it is possible to adjust the machining parameter that is not as expected. Thus, the undesired surface quality of the workpiece may be prevented even when the machine tool is in a steady-state cutting situation.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A monitoring method for a machine tool to machine a workpiece, the monitoring method comprising:
    detecting a vibration signal of a spindle of the machine tool;
    obtaining a vibration feature value of the vibration signal, wherein obtaining the vibration feature value of the vibration signal comprises:
        acquiring a time-domain signal of the vibration signal with a sampling frequency;
        converting the time-domain signal into a frequency-domain signal;
        obtaining at least one vibration value corresponding to at least one frequency equal to N multiple of a fundamental frequency of the frequency-domain signal, wherein N is an integer of 1 or more;
        calculating a sum of the at least one vibration value; and
        determining whether an additional vibration value exists beyond the N multiple of the fundamental frequency, wherein the additional vibration value is greater than the vibration value corresponding to 1 multiple of the fundamental frequency; and
        if the additional vibration value exists, the vibration feature value equals the sum plus the additional vibration value; and
        if the additional vibration value does not exist, the vibration feature value equals the sum;
    determining whether the vibration feature value exceeds a threshold condition determined by a training model based on a predetermined surface quality of the workpiece, wherein the training model is trained with a machining quality database through a machine learning algorithm, and the machining quality database is established according to the following steps:
        detecting a sample vibration signal of the spindle of the machine tool when machining a specimen with a machining condition, wherein the machining condition comprises a spindle speed and a feed speed of the machine tool;
        obtaining a sample vibration feature value of the sample vibration signal;
        measuring a sample surface quality of the specimen under the machining condition; and
        recording the machining condition and the sample vibration feature value and the sample surface quality under the machining condition; and
    adjusting a machining parameter of the machine tool when the vibration feature value exceeds the threshold condition, wherein adjusting the machining parameter of the machine tool comprises obtaining an optimized spindle speed of the machine tool, and obtaining the optimized spindle speed of the machine tool comprises:
        setting a speed interval;
        iteratively executing the following steps with different spindle speeds within the speed interval:
            detecting a test vibration signal of the spindle of the machine tool when trial machining a test piece with a predetermined spindle speed; and
            obtaining a test vibration feature value of the test vibration signal; and
        determining the predetermined spindle speed corresponding to a minimum test vibration feature value as the optimized spindle speed.

2. The monitoring method according to claim 1, wherein the additional vibration value results from a chatter of the spindle of the machine tool.

3. The monitoring method according to claim 1, wherein the predetermined surface quality is related to a surface roughness of the workpiece.

4. The monitoring method according to claim 1, wherein the step of obtaining the sample vibration feature value of the sample vibration signal comprises:
    acquiring a sample time-domain signal of the sample vibration signal with a sample sampling frequency;
    converting the sample time-domain signal to a sample frequency-domain signal;
    obtaining at least one sample vibration value corresponding to at least one frequency equal to N multiple of a fundamental frequency of the sample frequency-domain signal, wherein N is an integer of 1 or more;
    calculating a sample sum of the at least one sample vibration value; and
    determining whether an additional sample vibration value exists beyond the N multiple of the fundamental frequency of the sample frequency-domain signal, and the additional sample vibration value is greater than the sample vibration value corresponding to 1 multiple of the fundamental frequency of the sample frequency-domain signal; and
    if the additional sample vibration value exists, the sample vibration feature value equals the sample sum plus the additional sample vibration value; and if the additional sample vibration value does not exist, the sample vibration feature value equals the sample sum.

5. The monitoring method according to claim 4, wherein the additional sample vibration value results from a chatter of the spindle of the machine tool when machining the specimen with the machining condition.

6. The monitoring method according to claim 1, wherein the sample surface quality is related to a surface roughness of the specimen.

* * * * *